United States Patent
Loruenser et al.

(10) Patent No.: US 10,884,846 B2
(45) Date of Patent: Jan. 5, 2021

(54) METHOD FOR CHECKING THE AVAILABILITY AND INTEGRITY OF A DISTRIBUTED DATA OBJECT

(71) Applicant: AIT AUSTRIAN INSTITUTE OF TECHNOLOGY GMBH, Vienna (AT)

(72) Inventors: Thomas Loruenser, Vienna (AT); Stephan Krenn, Moedling (AT)

(73) Assignee: AIT Austrian Institute of Technology GmbH, Vienna (AT)

( * ) Notice: Subject to any disclaimer, the term of this patent is extended or adjusted under 35 U.S.C. 154(b) by 146 days.

(21) Appl. No.: 16/323,143

(22) PCT Filed: Aug. 1, 2017

(86) PCT No.: PCT/AT2017/060195
§ 371 (c)(1),
(2) Date: Feb. 4, 2019

(87) PCT Pub. No.: WO2018/023144
PCT Pub. Date: Feb. 8, 2018

(65) Prior Publication Data
US 2019/0188071 A1 Jun. 20, 2019

(30) Foreign Application Priority Data
Aug. 4, 2016 (AT) ............... A 50710/2016

(51) Int. Cl.
*G11C 29/00* (2006.01)
*H03M 13/00* (2006.01)
(Continued)

(52) U.S. Cl.
CPC .......... *G06F 11/1004* (2013.01); *G06F 3/067* (2013.01); *G06F 3/0619* (2013.01);
(Continued)

(58) Field of Classification Search
CPC .. G06F 11/1004; G06F 11/1474; G06F 13/00; G06F 13/28; G06F 15/16;
(Continued)

(56) References Cited

U.S. PATENT DOCUMENTS 6,964,008 B1 * 11/2005 Van Meter, III .... G06F 11/1004
714/766
8,132,073 B1 * 3/2012 Bowers ................ H04L 9/3271
714/755
(Continued)

FOREIGN PATENT DOCUMENTS

| DE | 102009030019 B3 | 12/2010 |
|---|---|---|
| WO | 9847264 A1 | 10/1998 |
| WO | 2011157708 A1 | 12/2011 |

*Primary Examiner* — Albert Decady
*Assistant Examiner* — Enamul M Kabir
(74) *Attorney, Agent, or Firm* — Laurence A. Greenberg; Werner H. Stemer; Ralph E. Locher

(57) ABSTRACT

A method for checking the availability and integrity of a data object stored on a plurality of servers and having a number N of data words. For the distributed storage on the servers, the data object is fragmented. Each fragment is transmitted to and stored on one server. To check the availability and integrity of the fragments stored on the servers, the same random number is sent from an auditor unit to the servers. A checksum is created by the servers, in each case modified by application of the random number to the data of the respective fragment, and the checksum is transmitted to the auditor unit. The auditor unit uses the consistency check to determine whether the individual checksums sent by the servers are consistent and, if this is the case, establishes the availability and integrity of the data.

18 Claims, 2 Drawing Sheets

(51) Int. Cl.
*G06F 11/10* (2006.01)
*H04L 9/08* (2006.01)
*H04L 29/06* (2006.01)
*H04L 9/32* (2006.01)
*G06F 21/62* (2013.01)
*G06F 3/06* (2006.01)

(52) U.S. Cl.
CPC ........ *G06F 3/0644* (2013.01); *G06F 21/6209* (2013.01); *H04L 9/085* (2013.01); *H04L 9/0894* (2013.01); *H04L 9/3239* (2013.01); *H04L 63/123* (2013.01); *G06F 2221/2103* (2013.01); *G06F 2221/2149* (2013.01)

(58) Field of Classification Search
CPC ................. G06F 21/6209; G06F 21/64; G06F 2221/2103; G06F 2221/2149; G06F 3/0619; G06F 3/0644; G06F 3/067; G06F 7/00; G11C 29/00; H04L 63/123; H04L 9/085; H04L 9/0894; H04L 9/3239; H03M 13/00
USPC ......... 707/637, 651, 652; 709/217; 711/100, 711/161; 714/752, 763, 807
See application file for complete search history.

(56) References Cited

U.S. PATENT DOCUMENTS

| | | | |
|---|---|---|---|
| 9,398,024 B2* | 7/2016 | Falk | H04L 9/3271 |
| 9,552,254 B1* | 1/2017 | Franklin | G06F 11/1012 |
| 9,778,987 B2* | 10/2017 | Shirley, Jr. | G06F 3/064 |
| 2005/0240749 A1* | 10/2005 | Clemo | G06F 21/6218 |
| | | | 711/170 |
| 2007/0150596 A1* | 6/2007 | Miller | G06F 21/10 |
| | | | 709/226 |
| 2008/0060085 A1 | 3/2008 | Samzelius et al. | |
| 2009/0094250 A1* | 4/2009 | Dhuse | G06F 11/1004 |
| 2010/0218037 A1* | 8/2010 | Swartz | G06F 16/00 |
| | | | 714/6.12 |
| 2011/0029840 A1* | 2/2011 | Ozzie | H03M 13/05 |
| | | | 714/763 |
| 2012/0243687 A1* | 9/2012 | Li | H04L 9/085 |
| | | | 380/277 |
| 2013/0136258 A1* | 5/2013 | Grube | H04L 67/306 |
| | | | 380/44 |
| 2013/0138706 A1* | 5/2013 | Dhuse | G06F 12/1408 |
| | | | 707/827 |
| 2013/0139252 A1* | 5/2013 | Paranjape | H04L 63/1458 |
| | | | 726/22 |
| 2013/0339818 A1* | 12/2013 | Baker | H03M 13/356 |
| | | | 714/763 |
| 2014/0046909 A1* | 2/2014 | Patiejunas | G06F 11/1076 |
| | | | 707/687 |
| 2014/0068259 A1* | 3/2014 | Resch | H04L 9/0861 |
| | | | 713/167 |
| 2014/0108855 A1* | 4/2014 | Gopakumar | G06F 11/008 |
| | | | 714/6.2 |
| 2015/0309863 A1* | 10/2015 | Shi | H04L 9/3218 |
| | | | 714/819 |
| 2017/0077950 A1* | 3/2017 | Pavlov | H03M 13/611 |

* cited by examiner

METHOD FOR CHECKING THE AVAILABILITY AND INTEGRITY OF A DISTRIBUTED DATA OBJECT

BACKGROUND OF THE INVENTION

Field of the Invention

The invention relates to a method for checking the availability and integrity of a data object that is stored in a distributed manner on a number of servers interconnected via a network.

The distributed storage of individual data is known from the prior art. There is the advantageous possibility that there are individual fragments of a data object stored distributed across different servers, from which the original data object may be reconstructed; while disclosing such fragments to unauthorized third parties, will gain them no significant information about the data object. In the prior art, different methods of fragmentation are known, by means which it is possible to reconstruct data objects based on a predetermined number of fragments. For example, it is possible to divide a data object into a total of 19 fragments, of which a total of 10 are needed to restore the original data object.

All of these methods have the drawback that a simple check of whether the individual fragments are available or intact requires that the entity checking the integrity and availability must also obtain knowledge of the content of the data object, and/or that the fragments must be preprocessed before saving and further components (e.g. MACs or so-called sentinels) must be added, which requires maintaining a permanent status for the data owner or auditor, while also increasing the total amount of data that must be stored. In particular, when an external audit of the data is to be carried out, for example by independent bodies that are supposed to ensure the availability and integrity of the data, it is not desirable for the content of the data objects to reach the inspecting entity (the auditor). Accordingly, the objective of the invention is to provide a method for checking the availability and integrity of a distributed stored data object, in which the auditor does not acquire any knowledge of the data the auditor is tasked with investigating the availability and integrity of. The invention accomplishes this task in a method of the aforementioned kind, having the features as claimed.

A straightforward determination of the position of corrupted data envisions that if the consistency check finds that the transmitted checksums are inconsistent, which of the checksums caused the inconsistency will be investigated, and the fragment from which this checksum originated will be identified as faulty.

A simplified test that may be carried out more quickly envisions that the auditor unit defines a predetermined subset of the individual fragments, which is used to derive the checksum of the individual fragments.

An increase in security, which gives the auditor unit further opportunities to gain knowledge of the data to be checked, envisions that in addition to the fragment and the random number, a random mask m is used to form the individual checksums, and that the individual random mask fragments used in the servers are sufficient to together satisfy the consistency check.

To avoid communication between the servers during the auditing process, it may be provided that the individual random mask fragments are distributed to the individual servers in advance and are used in a predetermined sequence. In this procedure, the individual servers do not need to have any knowledge of the other servers involved in the audit.

In addition, likewise for the purpose of increasing security, it may also be provided that the servers interact to create the random mask m, with none of the individual servers acquiring knowledge about the random mask fragments of the other servers, wherein each server transmits values to other servers, in particular to all other servers, and these values are used to compute the random mask fragments. In this case, the interaction between the individual servers may be exploited when creating the random masks, in order to increase the security of the audit.

A numerically particularly simple method for determining the checksum envisages that for computing the checksum, the respective fragment is divided into a number N of fragment data words, with a random mask m comprising one or more data words optionally being used, and the fragment is weighted and accumulated data-word-wise, the checksum computation rule being linear with respect to each individual data word of the fragment, and optionally also with respect to the random mask fragments.

In particular, it may be provided for this purpose that the checksum for the ith server is formed according to the following checksum computation rule:

$$p_i = P(f_i) = f_{i,1}*R + f_{i,2}*R^2 + \ldots [+m_i]$$

where R denotes the random number transmitted to all servers, $m_i$ denotes the random mask fragment of the respective server and optionally is taken into account in computing the checksum, $f_{i,j}$ denotes the jth data word of the fragment stored in the respective server, and in particular, the result of the checksum is subjected to a modulo operation using a predetermined value.

A preferred simple way of fragmenting data objects provides that the fragmentation of the data object is carried out by applying the predetermined fragmentation rule separately to each data word of the data object d, with n fragment data words being created for each data word respectively, and these being assigned to the fragments, and that the fragmentation rule is invertible and a reconstruction rule is specified, with the following relationship applying to any two data words:

$$F^{-1}(F(d_1) + F(d_2)) = d_1 + d_2$$

In order to avoid reconstructing data contents from a fragment, it may be provided that the fragmentation rule for the same data object delivers respectively different fragment data words as a function of random values, with the data words of the data object being obtained when the reconstruction rule is applied to the fragment data words.

A simple reconstruction of the data object from the fragments provides that for reconstructing the data object from the fragments, the individual fragment data words, respectively transmitted to the client in which the fragment data words that are respectively located at the same position relative to the respective fragment and/or are assigned to one another, are each subjected to a reconstruction rule.

A check of the availability and integrity of the data that requires a full reconstruction envisions that the individual checksums obtained from the servers are subjected to the reconstruction rule in the same way that fragment data words are, and the data is determined to have availability and integrity if reconstructions of m fragments based on the checksums all respectively yield the same result.

A particularly simple and numerically advantageous embodiment of the invention provides that given a number of n servers, a predetermined polynomial degree q of at most n−2 is provided, for each of the servers an index i is respectively specified, wherein the indices of the individual servers ($S_1, \ldots, S_n$) are different from each other in the fragmentation rule, the fragment data words are formed in such a way that a polynomial is formed having the predetermined degree q, which has the value of the data object that is being fragmented at a given interpolation point, in particular at point 0, wherein in particular the polynomial is otherwise selected according to random criteria OR all coefficients of the polynomial are represented by data words of the data object that will be fragmented, and the data words of the fragments are formed by evaluating the polynomial at the interpolation point corresponding to the index i of the respective server to which the fragment is transmitted, in the case of checksum computation, the individual fragmented data words are added in a weighted manner so that the checksum depends linearly on the individual data words of the fragments, and it is examined in the consistency check, in particular by means of interpolation, whether a polynomial of the predetermined degree q may be computed that has the checksums transmitted by the relevant server at the respective interpolation points that correspond to the indices of the server.

To form random masks, it may be advantageously provided in this context that when creating the random masks, each server creates a random polynomial of the given degree q and the polynomial is evaluated at the points corresponding to its index and the indices of the other servers, each server stores the value obtained by evaluating the polynomial at the server's index value and transmits the other values to the respective servers that have an index that corresponds to the index at which the polynomial was evaluated, The servers accumulate, and in particular add, the value stored at them and the values transmitted to them by the other servers, and the random mask fragments are ascertained in such manner.

In numerical terms, an evaluation is particularly advantageous if, in the context of all computational operations carried out, in particular in the case of the fragmentation rule, the checksum computation, the consistency check and, optionally, the creation of random masks, a) Data words are taken from a finite field, in particular a residue field or a field with 2a elements, where a is an integer, and b) the rules used for computing the sum or the product or the multiplicative or additive inverse of two data words are the rules applicable in the respective fields for computing sums or products or for inversion.

BRIEF DESCRIPTION OF THE SEVERAL VIEWS OF THE DRAWING

A plurality of preferred embodiments of the invention are illustrated in greater detail with reference to the following drawings.

DESCRIPTION OF THE INVENTION

Figure 1:
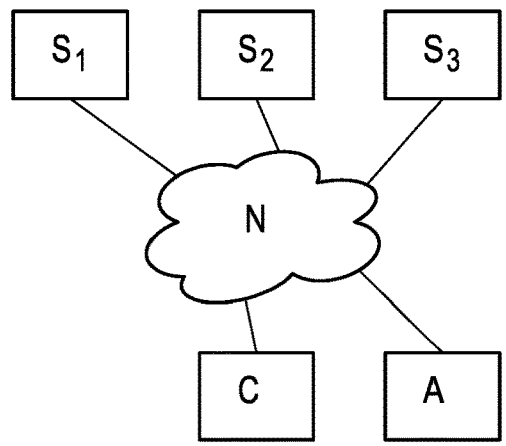
FIG. 1 shows a simple computer network for carrying out a method according to the invention.

FIG. 1 shows a simple computer network with a client C, a plurality of servers $S_1$, $S_2$, $S_3$, and an auditing unit A. The client C, the auditing unit A and the individual servers $S_1$, $S_2$, $S_3$ are interconnected via a network N. For the distributed storage of a data object d located on the client C on the servers $S_1$, $S_2$, $S_3$, the following steps are carried out:

The data object d is fragmented on the client C, and a number n=3 of fragments $f_1, \ldots, f_n$ are created. The number of created fragments $f_1, \ldots, f_n$ corresponds to the number of servers $S_1, \ldots, S_n$ that are used. Depending on how many servers $S_1, \ldots, S_n$ are to be used, a different number of fragments $f_1, \ldots, f_n$ are created. Subsequently, the fragments $f_1, \ldots, f_n$ are transferred individually to the servers $S_1, \ldots, S_n$.

Figure 2:
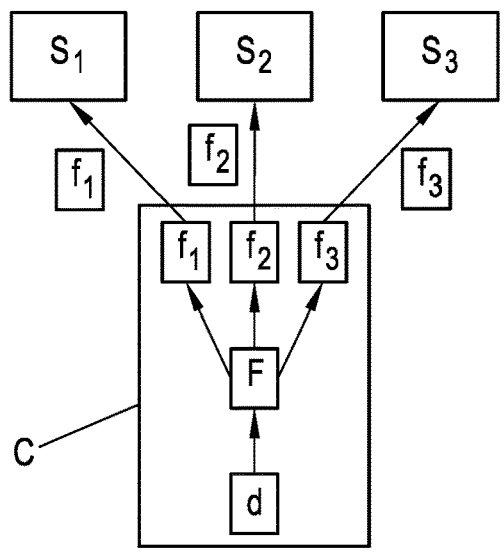
FIG. 2 shows the fragmentation and distribution of the fragments on the servers in one embodiment.

In this case, as shown in FIG. 2, fragment $f_1$ is transmitted to the server $S_1$, the fragment $f_2$ is transmitted to the server $S_2$ and the fragment $f_3$ to the server $S_3$.

To create the fragments $f_1, \ldots, f_n$, a fragmentation rule F is given by which data words are created for a data object for a number n=3 of fragments having the same data word count N=2.

It should be noted that the fragmentation rule F may yield different fragments $f_1, \ldots, f_n$, for the same data object, when, in the context of the fragmentation rule, random values are incorporated into the fragments that make the data contained in a single fragment unusable; in contrast, knowledge of the information contained in a definable number of fragments allows reconstructing the data object from the fragments.

The reconstruction rule $F^{-1}$ of the fragmentation rule F generates the original data object on the basis of the fragments. The reconstruction rule has the property that its application to the sum of two fragmented data words is the sum of the two unfragmented data words.

$$F^{-1}(F(d_1)+F(d_2))=d_1+d_2$$

For all embodiments, to simplify the representation of the procedure, the residue field $Z_{13}$ of 13 numbers is used as the data type for the individual data words. The data words may assume values from 0 to 12. The operations within this residue field correspond to the operations for integers, with a modulo operation being performed after each time addition or multiplication is performed, and that number being transformed into the range of numbers between 0 and 12. In this field, as in all fields, a multiplicative inverse $x^{-1}$ is available for every number x, which has the property that $x*x^{-1}=1$.

In addition, addition and multiplication may also be defined such that field properties also exist for sets of $P^a$ elements, where P is a prime and a is an arbitrary natural number. Taking advantage of this fact, such a field with P=2 and, for example, a=16 may be used to represent the data words instead of a residue field, i.e. each data word may be represented by a binary number, unambiguously and without wasting storage space, which is advantageous in terms of storage space utilization.

Due to the more complex implementation of addition and multiplication that must be defined in the field for this purpose, for the sake of clarity, the field $Z_{13}$ is chosen for the example calculation shown here.

Addition and multiplication are performed in the same way as for the natural numbers or integers, the operation modulo 13 being performed thereafter.

In the present case, a very simple example is shown in which the data object d and the individual fragments $f_1, \ldots, f_n$ are created. The fragments $f_1, \ldots, f_3$ are created redundantly such that a number of m=2<n fragments is sufficient for reconstructing the data object. In the present case, the data object d comprises two data words $d_1=4$ and $d_2=9$. For each individual data word, the client selects a random polynomial of degree q=m−1=1, the constant term of which belongs to the respective data word $d_1$, $d_2$ of the data object d, and the gradient $r_1$, $r_2$ of which represents a random value that all the servers share. By means of the fragmentation rule, for each data word of the data object, a polynomial $F_1(x)$, $F_2(x)$ is obtained, which may be defined, for example, by randomly selecting the gradients $r_1=8$, $r_2=6$ as follows:

$$F_1(x)=8x+4=r_1x+d_1 \quad F_2(x)=6x+9=r_2x+d_2$$

In the course of fragmentation, each of the servers $S_1$, $S_2$, $S_3$ is respectively assigned an index. The indices of the servers $S_1$, $S_2$, $S_3$ are given as integers (1, 2, 3). The polynomials formed in this way are evaluated in each case at those integer nodes that correspond to the indices of the respective server.

In the following, the determination of the fragment $f_1, \ldots, f_n$ is shown in more detail, which is transmitted to the first server $S_1$ after its creation.

In the present exemplary embodiment, the first server $S_1$ receives the index 1. The fragment data words $f_{1,1}$ $f_{1,2}$ of the fragment to be transmitted to the first server $S_1$ are determined according to $$F_{1,1}=F_1(1)=8*1+4=12 \quad f_{1,2}=F_2(1)=6*1+9=15 (\text{mod } 13)=2$$

Thus, a fragment is transmitted to the first server $S_1$ that contains the data words [12, 2].

In the present exemplary embodiment, the second server $S_2$ receives the index 2. The fragment data words $f_{2,1}$, $f_{2,2}$ of the fragment $f_2$ that will be transmitted to the second server $S_2$ are determined according to $$F_{2,1}=F_1(2)=8*2+4=20(\text{Mod } 13)=7 \quad f_{2,2}=F_2(2)=8$$

A fragment $f_2$ is thus transmitted to the second server that contains fragment data words [7,8].

In the present exemplary embodiment, the third server $S_3$ receives the index 3. The fragment data words $f_{3,1}$, $f_{3,2}$ of the fragment $f_3$ that will be transmitted to the third server $S_3$ are determined according to $$F_{3,1}=F_1(3)=2 \quad f_{3,2}=F_2(3)=1$$

A fragment $f_3$ is thus transmitted to the third server $S_3$ that contains the fragment data words [2,1].

Figure 3:
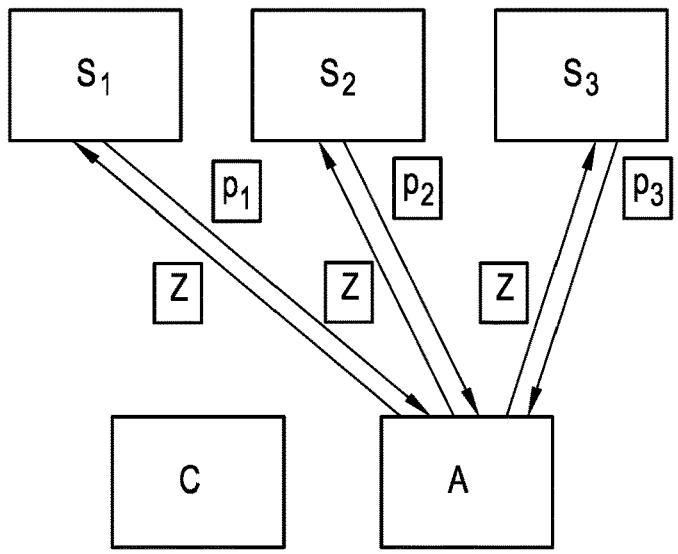
FIG. 3 shows an embodiment of the auditing of the data stored in distributed form.

The fragments $f_1$, $f_2$, $f_3$ transmitted to the individual servers $S_1$, $S_2$, $S_3$ are stored in the servers and kept available for further processing. In a further step shown in FIG. 3, an auditor unit A transmits a random number R that the auditor unit has created to each of the servers $S_1$, $S_2$, $S_3$. Each server $S_1$, $S_2$, $S_3$ uses the fragment $f_1$, $f_2$, $f_3$ present in it to determine, data word by data word, a checksum $p_1$, $p_2$, $p_3$ on the basis of the checksum computation rule shown below, the result also being subjected to the operation (mod 13) during fragmentation:

$$P_i=P(f_i)=f_{i,1}*R+f_{i,2}*R^2$$

By way of illustration, let us assume in the following example that the auditor unit A has chosen the random number R=4.

In the first server $S_1$, in which the data fragment [12, 2] is available, the result is:

$$p_1=12*4+2*16=80(\text{Mod } 13)=2.$$

In the second server $S_2$, in which the data fragment [7, 8] is available, the result is $$p_2=7*4+8*16=156(\text{Mod } 13)=0$$

In the third server $S_3$, in which the data fragment [2, 1] is available, the result is $$p_3=2*4+1*16=24(\text{Mod } 13)=11$$

The individual checksums $p_1=2$, $p_2=0$, $p_3=11$ are transmitted to the auditing unit A. In the consistency check, the auditing unit A checks whether points with a y-coordinate that corresponds to the checksum and an x-coordinate that corresponds to the index of the respective server $S_1$, $S_2$, $S_3$ lie on a polynomial of degree q=1. In the present case, the individual points lie on a polynomial g(x)=4−2x. The first $p_1$ checksum yields g(1)=4−2*1=2=$p_1$. The second checksum $p_2$ yields g(2)=4−2*2=0=$p_2$. The third checksum yields g(3)=4−2x=−2 (Mod 13)=$p_3$. Because all of the given values are on a polynomial of degree q=1, consistency may be confirmed.

Different calculation rules may be used to find such polynomials. A preferred way of finding polynomials based on the values given in the nodes requires the existence and calculation of a multiplicative inverse of the field properties of the relevant data word. Such a multiplicative inverse is necessarily present in a field.

The following considerations assume that to ensure privacy of the stored data, at most m−1 fragments or servers are corrupted. Otherwise, corrupt servers might share their m fragments to reconstruct the data. In the case of the values of n recommended in the literature (e.g. n=2m−1, n=3m−2), it follows directly that at least m uncorrupted fragments remain.

For the case described above, from the consistency of the fragments stored on the various servers, it follows that the stored data has integrity, i.e. the fragments, after reconstruction, will actually yield the originally stored data: Specifically, if the m unmodified fragments were reconstructed to the original data and all other fragments are consistent with them, any reconstruction of any m fragments will necessarily yield the original data.

If one of the fragments $f_{2,1}$ is changed, for example because of damage to the data carrier of the second server $S_2$, and it receives, for example, the value 10 instead of 7, the corresponding checksum $p_2$ for the second server S2 is:

$$p_2=10*4+8*16=168(\text{Mod } 13)=12.$$

Because, after the evaluation, the points [1, p1], [2, p2], [3, p3] no longer satisfy the consistency condition and no longer lie on a polynomial of degree q=1, the transmitted checksums $p_1$, $p_n$ are determined in the consistency check to be inconsistent.

If m+2 or more servers are used, it may also be determined which of the fragments inspected has been damaged or modified. If additional checksums p4, . . . for other servers are available, for example, a fourth unrepresented server with index 4 correctly determines the checksum $p_4$=9, it may be established that all other points [1, $p_1$], [3, $p_3$] [4, $p_4$] other than the point [2, $p_2$] lie on a polynomial of degree q=1, namely on the polynomial $g(x)=4-2x$. The fragment $f_2$ of the second server may be determined to be faulty.

In a second preferred embodiment of the invention, which is otherwise identical to the first embodiment of the invention, a random mask m may be used to form the individual checksums $p_1$, $p_2$, $p_3$ in each case in addition to the fragment $f_1$, $f_2$, $f_3$ and the random number R, with each of the individual servers $S_1$, $S_2$, $S_3$ respectively having a separate random mask fragment $m_1$, ..., $m_3$. The individual random mask fragments assigned to the servers likewise satisfy one another under the consistency conditions, i.e. the points [1, $m_1$], [2, $m_2$] [3, $m_3$] in the present exemplary embodiment lie on a polynomial of degree $q=1$. In this embodiment, there is no possibility for the auditor to obtain information about the data object.

The random mask fragments $m_1$, $m_2$, $m_3$ are used in computing the checksum $p_1$, $p_2$, $p_3$ as follows: Each request will use the other $m_1$, $m_2$, $m_3$ random mask fragments, which will respectively jointly satisfy the consistency condition. The random mask may comprise one or more data words.

One possible way of specifying the random mask m is to create a plurality of consistency-satisfying random mask fragments $m_1$, $m_2$, $m_3$ that satisfy the consistency condition for each of the servers $S_1$, $S_2$, $S_3$ in advance from an external trustworthy source or from the client C, and to use them in a predetermined sequence.

Of course, this assumes that the random mask fragments $m_1$, $m_2$, $m_3$ are each used by the same server group.

Figure 4:
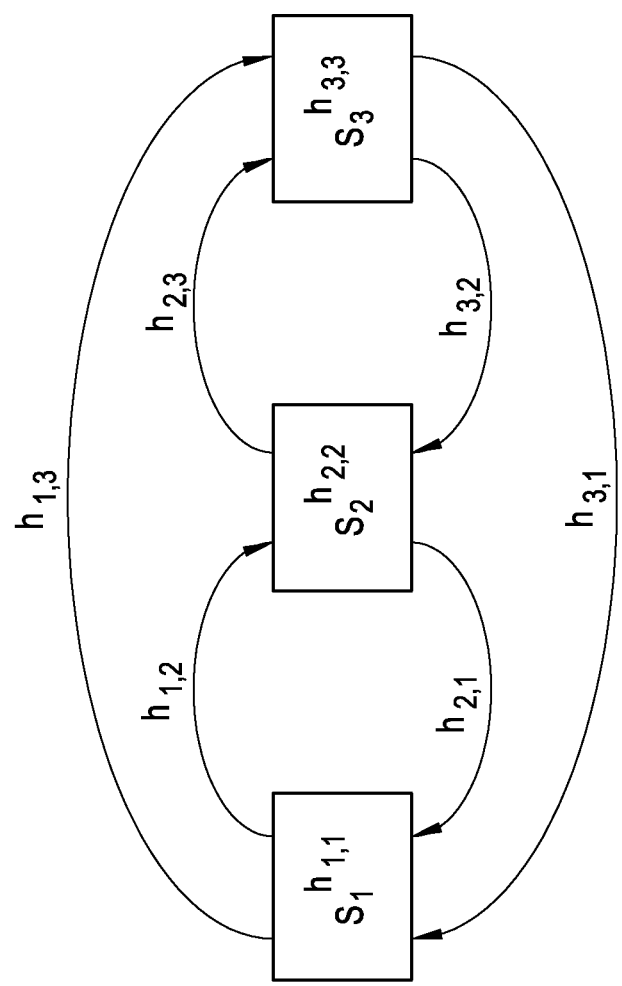
FIG. 4 shows a possible embodiment for creating random masks.

An alternative method described below in FIG. 4 makes it possible for the servers $S_1$, $S_2$, $S_3$ to create the random mask m collaboratively, with none of the individual servers $S_1$, $S_2$, $S_3$ gaining any knowledge about the random mask fragments $m_1$, $m_2$, $m_3$ of the other servers $S_1$, $S_2$, $S_3$. For each audit, the participating servers $S_1$, $S_2$, $S_3$ are each only aware of which servers $S_1$, $S_2$, $S_3$ the remaining fragments $f_1$, $f_2$, $f_3$ are stored on. This procedure has the advantage that random masks are generated for each audit and the number of audits need not be known in advance.

Each of the servers $S_1$, $S_2$, $S_3$ determines a random polynomial $g1(x)$, $g2(x)$, $g3(x)$ to generate the random mask, having the polynomial degree $q=1$ that is also used for the fragmentation, checksum computation and consistency check, and transmits the values of the polynomial $g_i(j)$ to the other servers $S_j$ having index j. In the following, this is illustrated by an example:

The first server $S_1$ creates the random polynomial $g_1(x)=2x+8$. It evaluates the polynomial at the points corresponding to its index (1) or the indices (2, 3) of the other servers $S_2$, $S_3$.

$$h_{1,1}=g_1(1)=10;\ h_{1,2}=g_1(2)=12;\ h_{1,3}=g_1(3)=14(\text{mod } 13)=1.$$

The first server S1 stores the value $h_{1,1}$, which it obtains when evaluating the polynomial at its own index (1) and transmits the value $h_{1,2}$ to the second server $S_2$ and the value $h_{1,3}$ to the third server $S_3$.

The second server $S_2$ creates the random polynomial $g_2(x)=3x+1$. It evaluates the polynomial at the locations corresponding to its index (2) or the indices (1,3) of the other servers $S_1$, $S_3$.

$$h_{2,1}=g_2(1)=4;\ h_{2,2}=g_2(2)=7;\ h_{2,3}=g_2(3)=10.$$

The second server $S_2$ stores the value $h_{2,2}$ which it obtains when evaluating the polynomial at its own index (2) and transmits the value $h_{2,1}$ to the first server $S_1$ and the value $h_{2,3}$ to the third server $S_3$.

The third server $S_3$ creates the random polynomial $g3(x)=7x+7$. It evaluates the polynomial at the points which are located in its index (3) or the indices (1, 2) of the other servers $S_1$, $S_2$.

$$h_{3,1}=g_3(1)=14(\text{mod } 13)=1;\ h_{3,2}=g_3(2)=21(\text{mod } 13)=8;$$

$$h_{3,3}=g_3(3)=28(\text{mod } 13)=2.$$

The third server $S_3$ stores the value $h_{3,3}$ which it obtains when evaluating the polynomial at its index (3) and transmits the value $h_{3,1}$ to the first server $S_1$ and the value $h_{3,2}$ to the second server $S_2$.

In a further step, all the servers $S_1$, $S_2$, $S_3$ add the value stored at them as well as the values transmitted to them by the remaining servers $S_1$, $S_2$, $S_3$, and optionally the servers carry out the modulo operation. The values $m_1$, $m_2$, $m_3$ of the random masks correspondingly are:

$$m_1=h_{1,1}+h_{2,1}+h_{3,1}=10+4+1(\text{mod } 13)=2;$$

$$m_2=h_{1,2}+h_{2,2}+h_{3,2}=12+7+8(\text{mod } 13)=1;$$

$$m_3=h_{1,3}+h_{2,3}+h_{3,3}=1+10+2(\text{mod } 13)=0.$$

When calculating the checksums $p_1$, $p_2$, $p_3$, the random mask fragments are considered as follows:

$$p_i=P(f_i)=f_{i,1}*R+f_{i,2}*R^2+m_i$$

In the first server $S_1$, in which the data fragment [12, 2] is available, the result is:

$$p_1=12*4+2*16+2=82(\text{Mod } 13)=4.$$

In the second server $S_2$, in which the data fragment [7, 8] is available, the result is $$p_2=7*4+8*16+1=157(\text{Mod } 13)=1$$

In the third server $S_3$, in which the data fragment [2, 1] is available, the result is $$p_3=2*4+1*16+0=24(\text{Mod } 13)=11$$

The individual checksums $p_1=4$, $p_2=1$, $p_3=11$ are transmitted to the auditing unit A. In the consistency check, the auditing unit A checks whether points with a y-coordinate that corresponds to the checksum and an x-coordinate that corresponds to the index of the respective server $S_1$, $S_2$, $S_3$ that generated the checksum $p_1$, $p_2$, $p_3$ lie on a polynomial of degree $q=1$. In the present case, the individual points lie on a polynomial $g(x)=7-3x$. The first checksum $p_1$ yields $g(1)\ 7=7-3*1=2=p_1$. The second checksum $p_2$ yields $g(2)=7-3*2=1=p_2$. The third checksum $p_3$ yields $g(3)=7-3*3=-2$ (Mod 13)$=11=p_3$. Because all of the specified values are based on a polynomial of degree $q=1$, it is possible to determine consistency and thus to determine the availability and integrity of the data.

To reconstruct the data object (d) from the fragments $f_1$, ..., $f_n$, the individual fragment data words $f_1$, ..., $f_{n,N}$ of the fragments $f_1$, ..., $f_n$ in which the fragment data words $(f_{1,1}, ..., f_{n,N})$ that are respectively located at the same position relative to the respective fragment $f_1$, ..., $f_n$ and/or are assigned to one another, are transmitted to the client C or to another authorized computer and are reconstructed by data word.

To reconstruct the first data word $d_1$, a polynomial $k_1$ of degree $q=1$ is sought which has the values of the first fragment data words $f_{1,1}$, $f_{2,1}$, $f_{3,1}$ of the fragments $f_1$, $f_2$, $f_3$ at the nodes corresponding to the indices (1, 2, 3) of the servers. Similarly, to reconstruct the second data word $d_2$ of the data object, a polynomial $k_2$ of degree $q=1$ is sought which has the values of the first fragment data words $f_{1,2}$, $f_{2,2}$, $f_{3,2}$ of the fragments $f_1$, $f_2$, $f_3$ at the nodes corresponding to the indices (1, 2, 3) of the servers:

$$k_1(1)=12; k_1(2)=7; k_1(3)=2$$

$$k_2(1)=2; k_2(2)=8; k_2(3)=1$$

Such polynomials may be found by simple arithmetic operations, because a multiplicative inverse is always available in a field:

$$k_1(x)=4-5x(\text{mod } 13); k_2(x)=9+6x(\text{mod } 13)$$

If these polynomials $k_1$ $k_2$ are respectively evaluated at the position 0, one obtains the original data words of the data object.

$$d_1=k_1(0)=4; d_2=k_2(0)=9.$$

In all embodiments of the invention, it is of course also possible to use polynomials of other polynomial degrees q, wherein in each case the same degree of polynomial q is used for the fragmentation, the checksum computation, the consistency check and optionally the formation of the random masks. In addition, it should be noted that the polynomial degree q determines a minimum number m>q of servers $S_1$, $S_2$, $S_3$, on which integer data must be available in order for a reconstruction to be possible. Using a larger number of n servers $S_1$, $S_2$, $S_3$ and a larger number m of fragments required for the reconstruction additionally increases the security, in particular values of n=2m−1 or n=3m−2 may be selected.

If there are longer fragments in which computing checksums represents a greater resource load, it is also possible that only a subset of the individual fragments $f_1, \ldots, f_n$ that has been randomly predetermined by the auditor unit A is defined at each audit, and is used to compute the checksums $p_1, \ldots, p_n$ for the individual fragments $f_1, \ldots, f_n$.

The invention claimed is:

1. A method for checking the availability and integrity of a data object having a number N of data words distributed on a plurality of servers that are connected to one another via a network, the method comprising:
   specifying a fragmentation rule and creating a number n of fragments of the data object under the fragmentation rule, the fragments being created redundantly such that a number m≤n of fragments is sufficient to reconstruct the data object;
   providing a consistency check which, in the presence of a number of fragments that is greater than m, checks whether these fragments are consistent with each other and/or originate from the same data object;
   providing a checksum computation rule for computing a checksum from a fragment;
   coordinating the fragmentation rule, the consistency check and the checksum computation rule such that:
      individual fragments created by the fragmentation rule from a data object are consistent with regard to the consistency check;
      checksums that were computed by way of the checksum computation rule, which were ascertained from fragments formed by means of fragmentation rule based on the same data object, are consistent with regard to the consistency check;
   storing the data object in distributed storage on the plurality of servers by:
      fragmenting the data object to create a number of fragments; and
      transmitting the fragments to respective servers, storing the fragments and making the fragments available for retrieval from the servers;
   verifying the availability and integrity of the fragments stored on the servers by:
      transmitting a given random number from an auditor unit to the servers;
      generating a respective checksum in the servers by applying the random number to the data of the respective fragment, and transmitting the checksum to the auditor unit; and
   examining with the auditor unit by way of the consistency check whether the individual checksums transmitted by the servers are consistent and, when the checksums are consistent, inspecting the availability and integrity of the data.

2. The method according to claim 1, wherein, in the event that the consistency check determines that the transmitted checksums are inconsistent, examining which of the checksums caused the inconsistency, and determining the fragment from which the given checksum originates to be faulty.

3. The method according to claim 1, which comprises defining with the auditor unit a predetermined subset within the individual fragments to be used to derive the checksum of the individual fragments.

4. The method according to claim 1, which comprises, to compute the individual checksums, in each case, in addition to the fragment and the random number, using a random mask m, wherein the individual random mask fragments used in the servers jointly satisfy the consistency check.

5. The method according to claim 4, which comprises distributing the individual random mask fragments in advance to the individual servers and using the individual random mask fragments in a predetermined order.

6. The method according to claim 4, wherein the servers create the random mask m collaboratively, none of the individual servers gaining any knowledge about the random mask fragments of the other servers, and each server transmits values to the other servers, and the values are used to compute the random mask fragments.

7. The method according to claim 1, which comprises, for computing the checksum, dividing the respective fragment into a number of N fragment data words, optionally using a random mask m comprising one or more data words, and weighting and accumulating the fragment data word by data word, the checksum computation rule being linear with respect to each individual data word of the fragment and optionally also with respect to the random mask fragments.

8. The method according to claim 7, which comprises forming the checksum for an $i^{th}$ server according to the following checksum computation rule:

$$p_i=P(f_i)=f_{i,1}*R+f_{i,2}*R^2+ \ldots [+m_i],$$

where:
R denotes the random number transmitted to all servers;
m denotes the random mask fragment of the respective server, and is optionally taken into account in computing the checksum;
$f_{i,j}$ denotes a $j^{th}$ data word of the fragment stored in the respective server; and
a the result of the checksum is subjected to a modulo operation with a predetermined value.

9. The method according to claim 1, which comprises:
fragmenting the data object by applying the predetermined fragmentation rule separately to each data word of the data object d, wherein for each data word, n fragment data words are created and are assigned to the fragments; and wherein the fragmentation rule is invertible and a reconstruction rule is specified, in which the following relationship applies to any two data words:

$F^{-1}(F(d_1)+F(d_2))=d_1+d_2$.

10. The method according to claim 9, wherein the fragmentation rule for the same data object delivers different fragment data words depending on random values, with the data words of the data object being obtained when the reconstruction rule is applied to the fragment data words.

11. The method according to claim 1, which comprises reconstructing the data object from the fragments by respectively transmitting the individual fragment data words to a client, wherein the fragment data words that are respectively located at the same position relative to the respective fragment and/or are assigned to one another, are each subjected to a reconstruction rule.

12. The method according to claim 1, which comprises subjecting the individual checksums obtained from the servers to the reconstruction rule like fragment data words and determining the data to be available and have integrity if reconstructions of each m fragments based on the checksums all yield the same result.

13. The method according to claim 1, wherein:

given a number of n servers, providing a predetermined polynomial degree q of at most n−2;

specifying an index i for each of the servers, the indices of the individual servers being different from each other;

in the fragmentation rule, forming the fragment data words in such a way that:

a polynomial is formed having the predetermined degree q, which at a predetermined node, in particular at point 0, has the value of the data word of the data object that is being fragmented, wherein in particular the polynomial is otherwise selected according to random criteria OR all coefficients of the polynomial are represented by data words of the data object that will be fragmented; and the data words of the fragments are computed by evaluating the polynomial at a node that corresponds to the index i of the respective server to which the fragment is transmitted;

in the checksum computation, adding the individual fragmented data words in a weighted manner so that the checksum is a linear function of the individual data words of the fragments; and investigating, in the consistency check, whether a polynomial of the predetermined degree q may be formed if it corresponds to the respective nodes that correspond to the indices of the server that purportedly correspond to the checksums transmitted by the relevant server.

14. The method according to claim 13, wherein the investigating step comprises performing the consistency check by interpolation.

15. The method according to claim 13, which comprises generating random marks by:

creating with each server a random polynomial of the predetermined degree q and evaluating the polynomial at the points of its index and the indices of the other servers;

storing with each server the value which the server has obtained when evaluating the polynomial at its index value, and transmitting the other values to the respective servers that have an index that corresponds to the index at which the polynomial was evaluated;

accumulating with the servers a value stored therein and values transmitted to the respective server by the other servers, to thus determine the random mask fragments.

16. The method according to claim 15, wherein the accumulating step comprises adding the value stored in the given server and the values transmitted from the other servers.

17. The method according to claim 1, which comprises, for all computational operations carried out in the method:

a) taking data words from a finite field;

b) rules used for computing a sum or a product or a multiplicative or additive inverse of two data words are the rules applicable in the respective fields for computing sums or products or for inversion.

18. The method according to claim 17, wherein the computational operations are selected from the group consisting of the fragmentation rule, the checksum computation, the consistency check and a creation of random masks, and step a) comprises taking data words from a residue field or a field with 2a elements, where a is an integer.

\* \* \* \* \*